United States Patent [19]

Geyer et al.

[11] Patent Number: 5,108,216

[45] Date of Patent: Apr. 28, 1992

[54] CAM LOCKING SYSTEM

[75] Inventors: Freddy Geyer, Cannes La Bocca; Jean-Pierre Scheffter, Le Cannet; Gérard Vezain, Mandelieu, all of France

[73] Assignee: Societe Anonyme dite: Aerospatiale Societe Nationale Industrielle, Paris, France

[21] Appl. No.: 580,112

[22] Filed: Sep. 10, 1990

[30] Foreign Application Priority Data

Sep. 12, 1989 [FR] France .................. 89 11898

[51] Int. Cl.⁵ .......................... B25G 3/18
[52] U.S. Cl. ...................... 403/330; 403/409.1; 403/DIG. 8; 24/498; 292/257
[58] Field of Search ........... 403/330, DIG. 8, 409.1; 24/498; 292/257, DIG. 7, DIG. 73

[56] References Cited

U.S. PATENT DOCUMENTS

| | | |
|---|---|---|
| 736,053 | 8/1903 | Armstrong ............. 292/257 X |
| 945,081 | 1/1910 | Burt ..................... 24/498 X |
| 1,511,704 | 10/1924 | Buck .................... 24/498 X |
| 2,060,214 | 11/1936 | Hitchens ............... 24/498 X |
| 2,143,575 | 1/1939 | Raymond . |
| 2,553,144 | 5/1951 | Olsen .................... 24/498 X |
| 3,565,448 | 2/1971 | Angelbeck ............. 24/498 X |
| 4,274,666 | 6/1981 | Peck ..................... 292/257 |

FOREIGN PATENT DOCUMENTS

| | | |
|---|---|---|
| 0146996 | 7/1985 | European Pat. Off. . |
| 971458 | 7/1950 | France . |
| 17149 | 7/1912 | United Kingdom . |
| 1242639 | 8/1971 | United Kingdom . |

Primary Examiner—Andrew V. Kundrat
Attorney, Agent, or Firm—Marshall, O'Toole, Gerstein, Murray & Bicknell

[57] ABSTRACT

A locking system is disclosed comprising two elements connected mechanically together so as not to be able to move apart, as well as a cam mounted for rotation on the first of said elements and having a contact surface pressing against a bearing face carried by the second of said elements.

According to the invention, said contact surface of said cam has at least approximately a profile in the form of a logarithmic spiral, whereas said bearing face is flat and said cam may rotate about a hub on the axis of which is located the origin of said logarithmic spiral, said hub being mounted for rotation on said first element about an off-centered axis of rotation opposite said contact surface of said cam. Resilient means are provided for rotating said cam in a first direction such that said contact surface moves towards said bearing face.

10 Claims, 10 Drawing Sheets

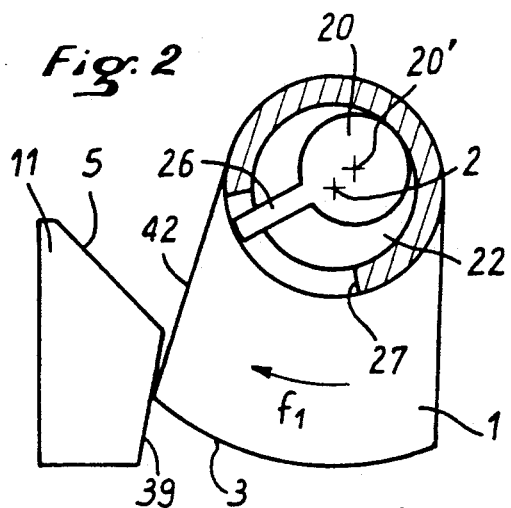
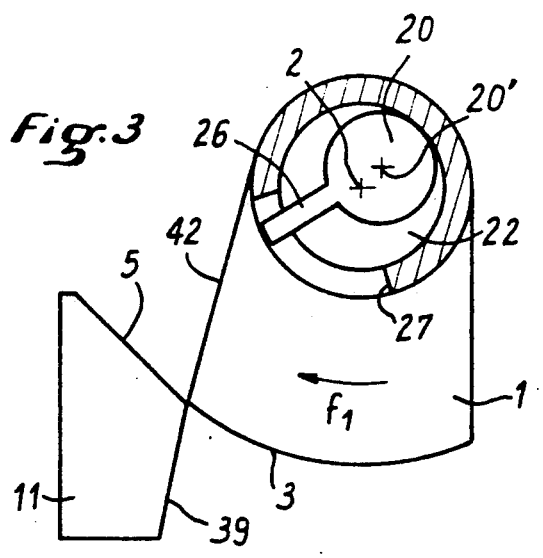
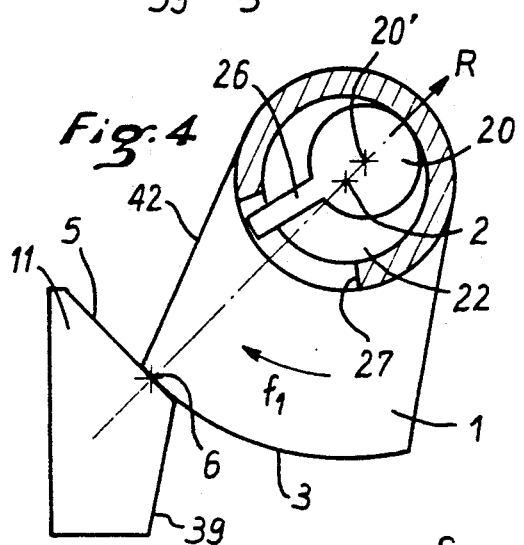
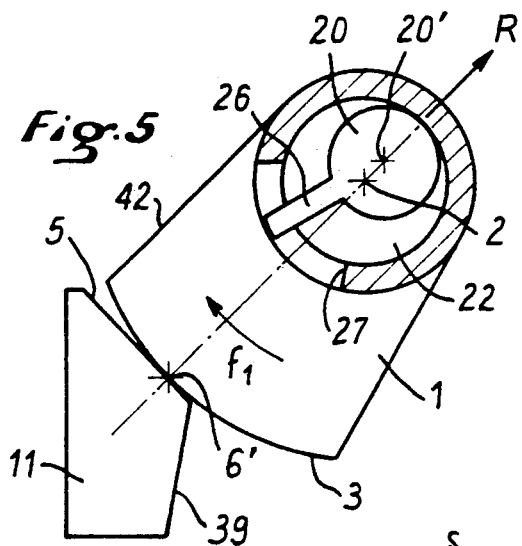
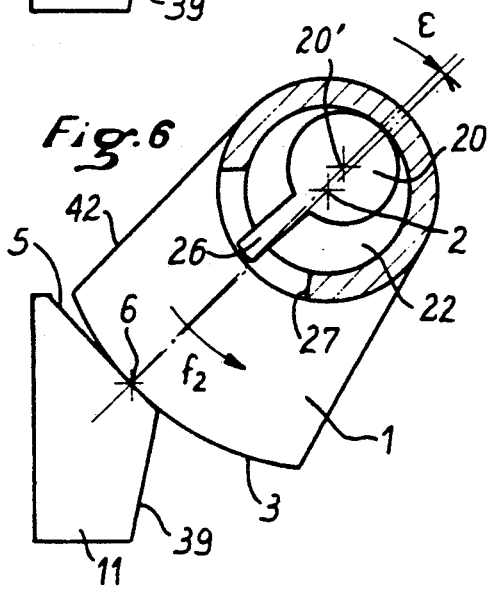
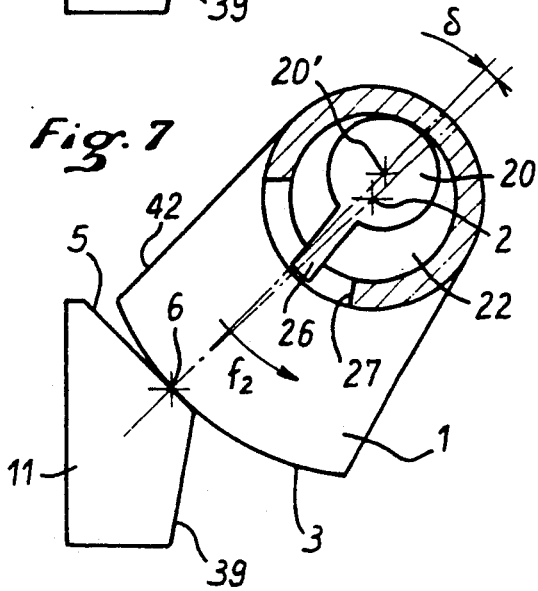

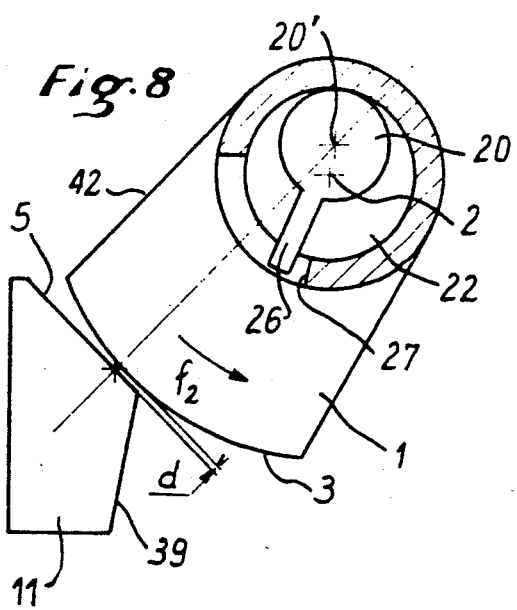
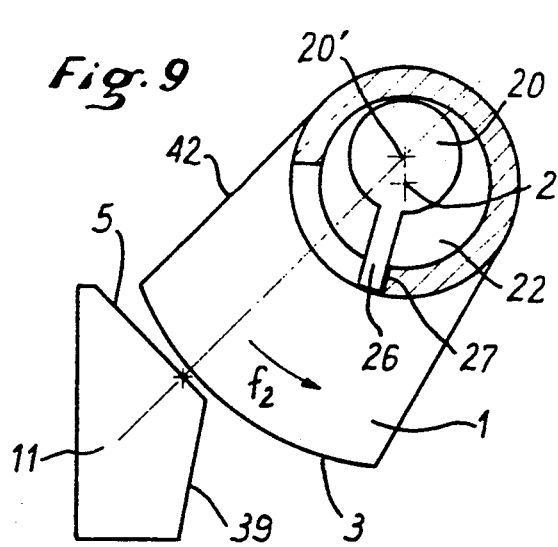
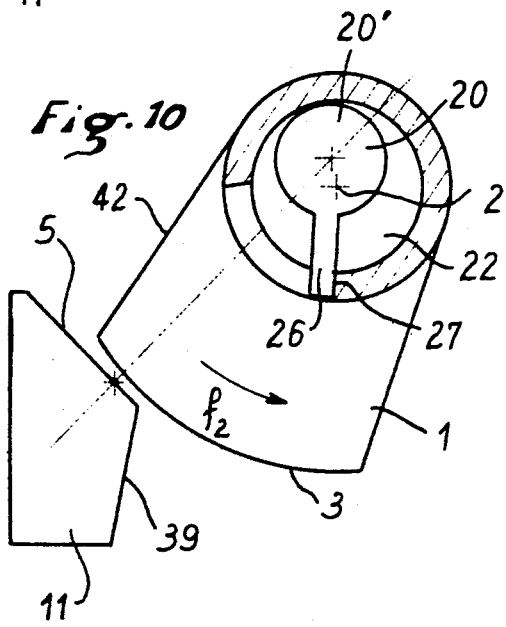
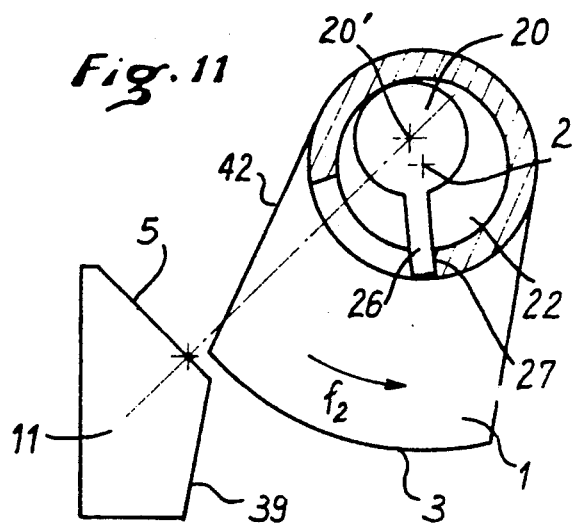
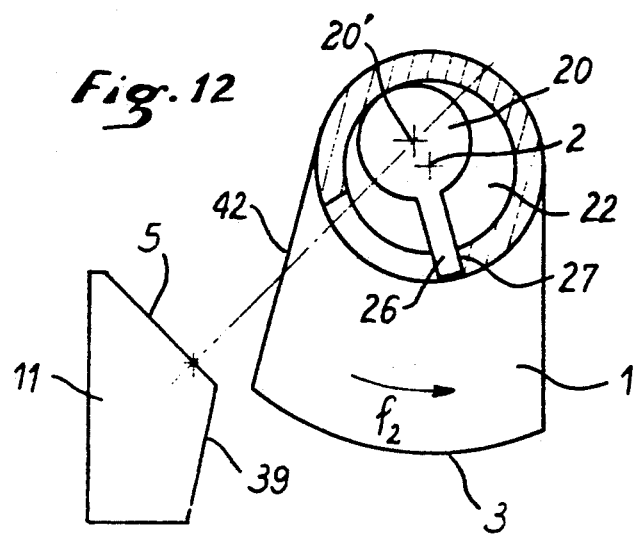

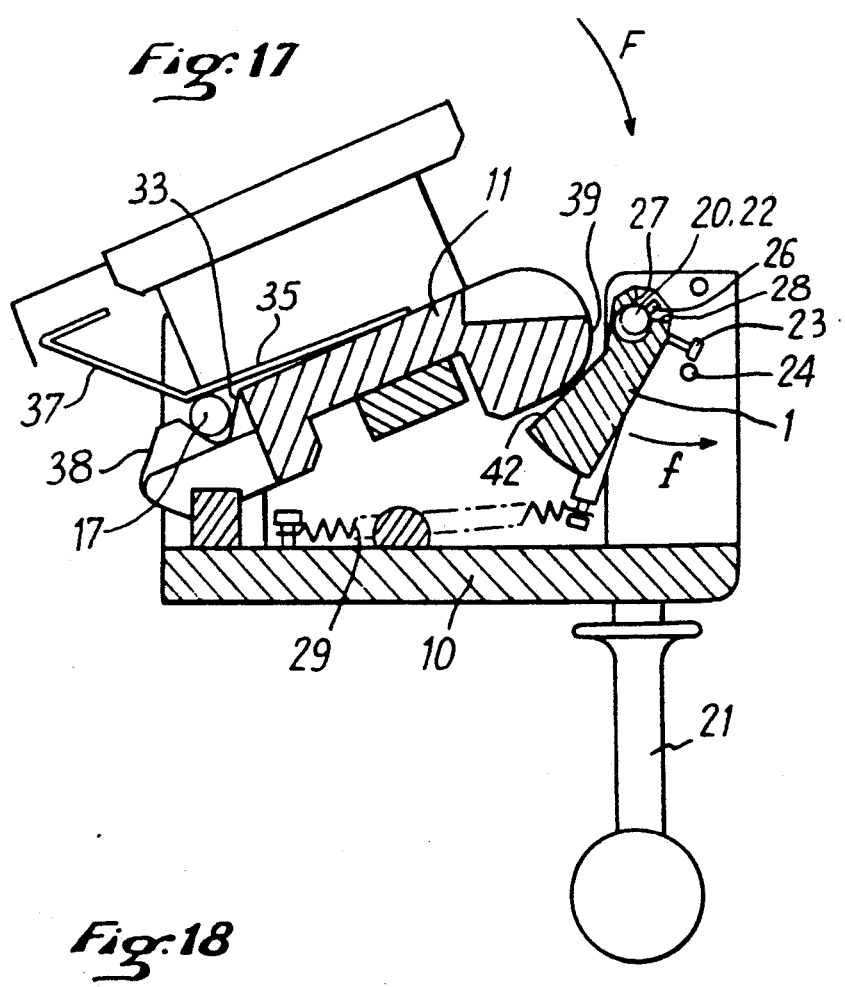
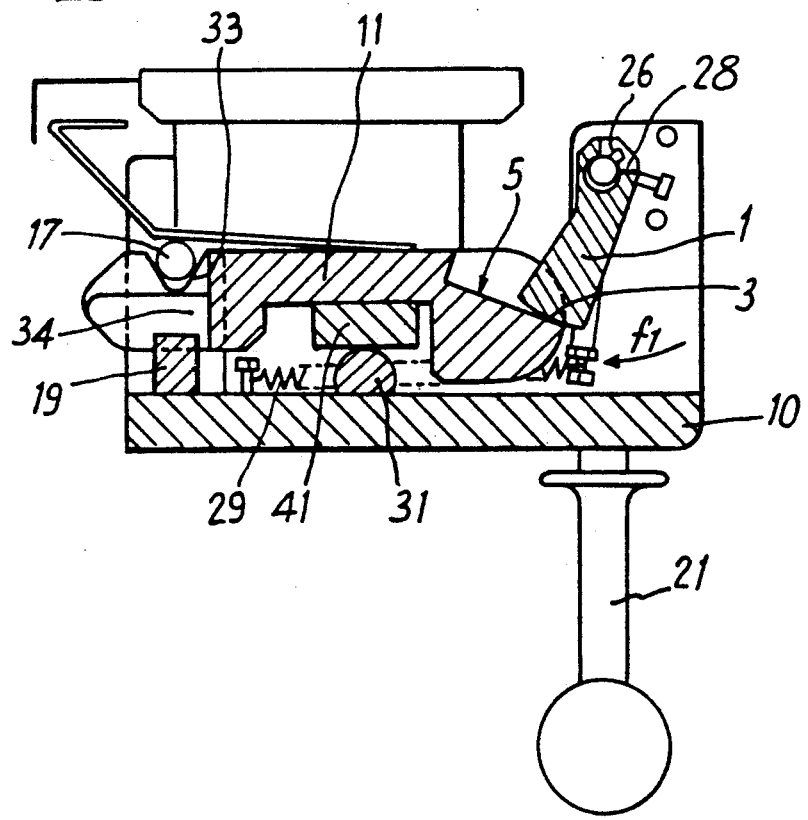

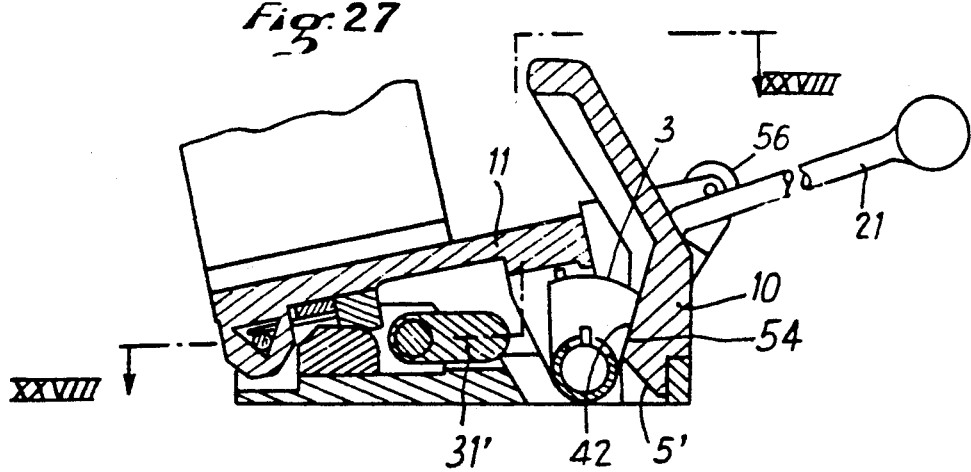
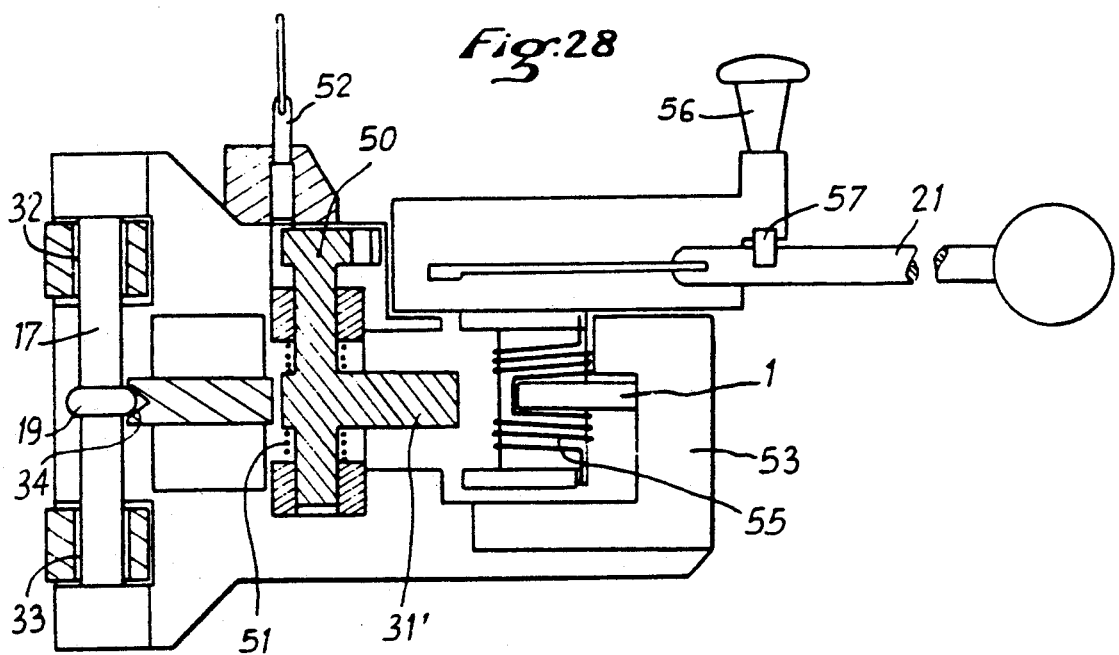
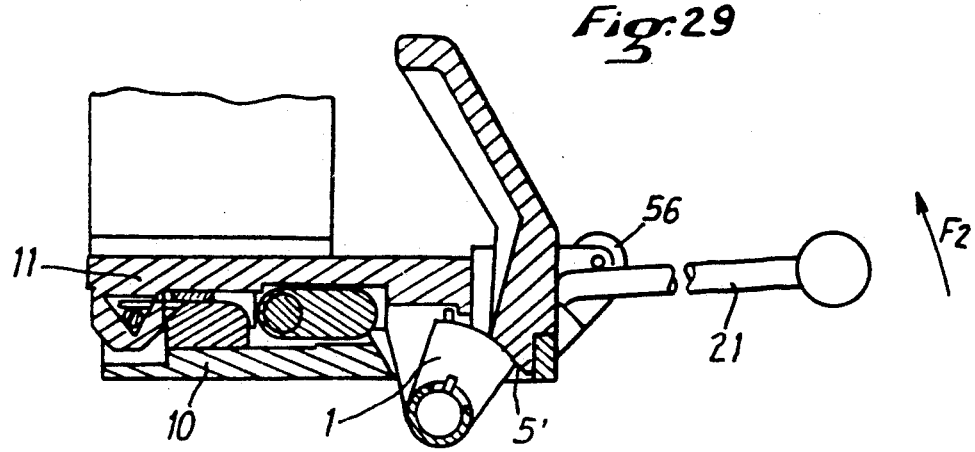

CAM LOCKING SYSTEM

BACKGROUND OF THE INVENTION

The present invention relates to a cam locking system for two elements, intended particularly for locking and unlocking said elements rapidly in difficult conditions and environments, such as those imposed underwater or in space (and particularly outside space vehicles). Such a locking system makes it possible to connect together two parts which are fixed respectively to said elements.

The invention is intended to simplify as much as possible the manoeuvres to be carried out by an operator, as well as reducing as much as possible the energy required for locking and unlocking said elements (and so said parts which are fixed thereto), while providing locking without play, insensitive to temperature variations and requiring no lubrication.

SUMMARY OF THE INVENTION

To this end, in accordance with the invention, the locking system comprising two elements connected mechanically together so as not to be able to move apart, as well as a cam mounted for rotation on the first of said elements and having a contact surface pressing against a bearing face of the second of said elements, is remarkable:
  in that said contact surface of said cam has at least approximately a profile in the shape of a logarithmic spiral, whereas said bearing face is flat;
  in that said cam may rotate about a hub, on the axis of which is located the origin of said logarithmic spiral, said hub being mounted for rotation on said first element about an off-centered axis of rotation opposite said contact surface of said cam, with respect to the axis of said hub;
  in that resilient means are provided for rotating said cam in a first direction such that said contact surface moves towards said bearing face;
  in that said hub carries a stub, which is interlocked for rotation therewith and which may drive said cam in rotation in a second direction, opposite the first one, said stub not preventing rotation of said cam in said first direction under the action of said resilient means; and
  in that means are provided for rotating said hub about said off-centered axis of rotation in said second direction.

Thus, as will be seen in detail further on, through the cooperation of said contact and bearing faces, spontaneously irreversible locking is obtained, which can then be readily locked with a small force. In addition, because of the off-centered mounting of the cam, the locking of the invention is also easily unlockable.

It will be noted that said contact face of the cam may not be strictly in the form of a logarithmic spiral, provided that the approximation curve of the spiral is such that the hereafter recalled geometric properties are respected by said approximation curve.

It is advantageous for the second of said elements to have retraction means for momentarily pushing said cam back against the action of said resilient means, when said elements are brought close together and when the contact surface of said cam bears on said bearing face of said second element by spontaneous snap-fitting under the action of said resilient means, after having escaped from said retraction means, for locking said elements.

Preferably, the closed up locked position of said elements is defined by a stop system. Similarly, the endmost position which said cam may assume under the action of said resilient means may be defined by a stop.

In order to simplify the relative drawing together of said elements, it is advantageous for said first and second elements to be articulated together at their ends respectively opposite said cam and said bearing face, about an axis parallel to the axis of rotation of said cam.

This articulation of said first and second elements may form a non-demountable connection.

On the contrary, in a variant of construction, the articulation of said first and second elements may form a demountable connection.

In both cases, in order to take up the play automatically, it is preferable for the articulation between said first and second elements to be formed by a fixed shaft fast with one element and by a V-shaped bearing surfaces integral with the other element.

In order to obtain relative positioning, with takeup of play and take-up of the forces, of said elements transversely to said axis of rotation, one of said elements is integral with V-shaped bearing surfaces of a direction orthogonal to said axis of rotation between said elements, whereas the other element comprises a stop able to bear against said V-shaped bearing surfaces when said elements are in the closed up position.

In an advantageous embodiment of the present invention, said stop system defining the closed up position of said two elements is provided for defining several different closed up positions of said two elements, said second element comprises several retraction means and several separate bearing faces and, for each closed up position, said cam bears by its contact face against one of said bearing faces.

BRIEF DESCRIPTION OF THE DRAWINGS

The figures of the accompanying drawings will better show how the invention may be implemented. In these FIGS, identical references designate similar elements.

FIGS. 2 to 12 are diagrams illustrating the operation of the locking system provided with the cam of FIG. 1;

FIGS. 17 and 18 illustrate, in schematic longitudinal section, the spontaneous locking procedure of the two elements of FIG. 13;

FIGS. 23 to 27 and 29 illustrate, in views similar to FIG. 22, the operation of the system of this last FIG; and FIG. 28 is a top view of the system of FIG. 22, in its position illustrated in FIG. 27 and through line XXVIII—XXVIII of this last figure.

DESCRIPTION OF THE PREFERRED EMBODIMENTS

Figure 1:
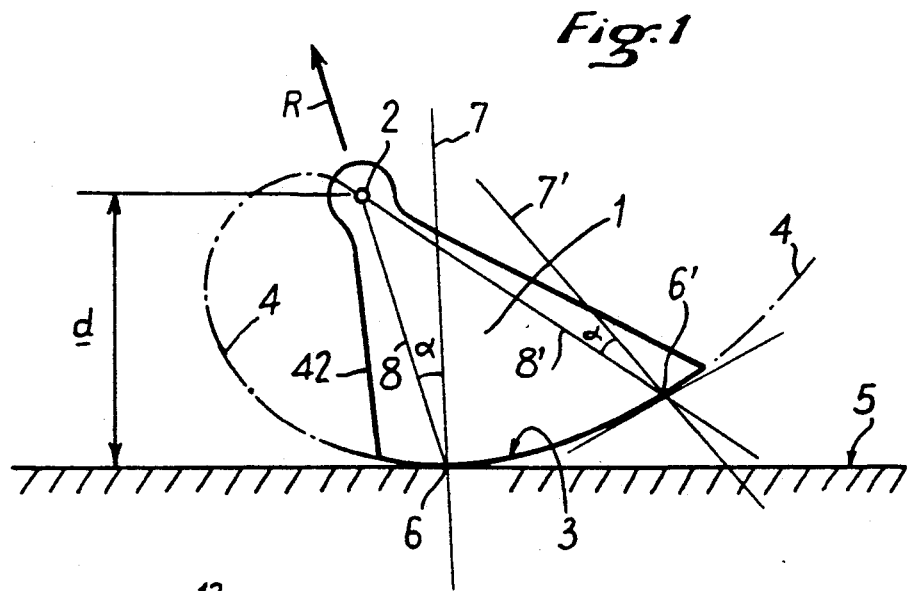
FIG. 1 is a schematic diagram explaining the properties of the cam used in the present invention.

In FIG. 1 a flat cam 1 has been shown which is able to rotate about an axis 2 orthogonal to its plane and whose contact face 3 is a portion of a logarithmic spiral 4 whose origin is located on axis 2. Cam 1 bears on a flat surface 5 at point 6.

As is known, one of the characteristics of such a logarithmic spiral is that the angle formed between the normal 7, 7' at a point of the spiral and the radius 8, 8' passing through this point is constant, whatever this point 6, 6'. In the figure, this angle is designated by $\alpha$.

Consequently, for cam 1, the result is four important properties:

- if the value of angle $\alpha$ is determined so that its tangent is less than that of the friction angle (generally designated by $\phi$ in mechanics), the reaction R at bearing point 6 is inside the friction cone, so that the cam is locked;
- this stable and irreversible bearing position is obtained whatever the point 6 or 6' of the cam 1 which is in contact with surface 5;
- if, in a mechanical assembly, the distance d separating the axis of rotation 2 from surface 5 is variable, for example because of vibrations, variations of the loads applied or for reasons of manufacturing tolerances or temperature variations, it is possible to compensate for these variations of distance d and, despite them, to find a stable and irreversible bearing point of cam 1 on surface 5, by rotating same, since the radii 8, 8' have different lengths; and
- if, with a stable bearing point obtained at 6 for a given radius 8, cam 1 and/or the bearing surface 5 are subjected to vibrations or load variations, the stable bearing point may move to 6', for a radius 8' larger than radius 8, by spontaneous rotation of the cam; it then becomes more difficult to rotate the cam 1 voluntarily about axis 2 in the direction opposite the spontaneous rotation.

The present invention takes advantage of these features.

In FIGS. 2 to 12, we find again cam 1, its axis of rotation 2, its logarithmic contact surface 3 and the flat bearing surface 5. More particularly, in these FIGS. 2 to 12, mounting of cam 1 is similar to that of the embodiment illustrated in FIGS. 22 to 29.

Figure 14:
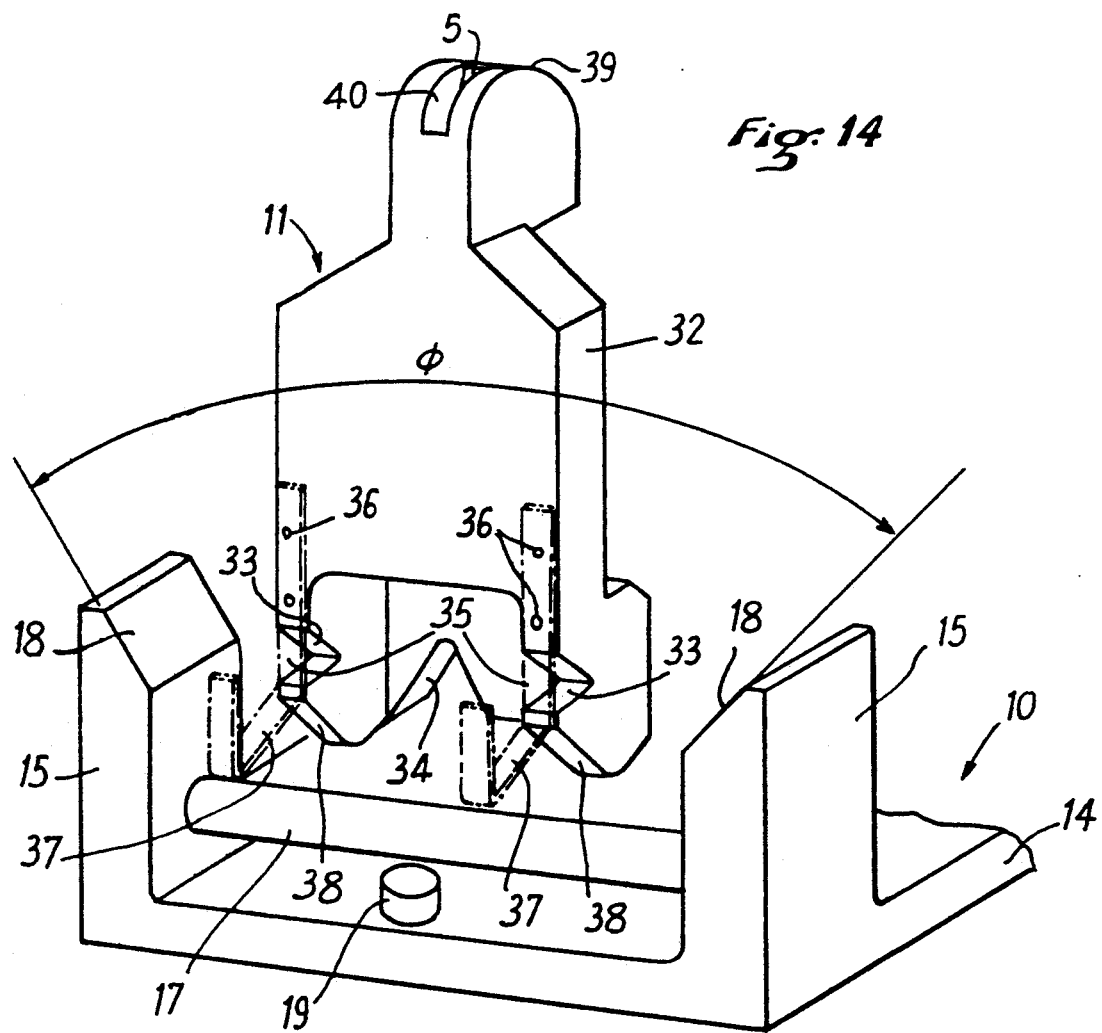
FIG. 14 is a partial perspective view showing the two elements of the system of FIG. 13, in their relative positions illustrated in FIG. 13.
Figure 15:
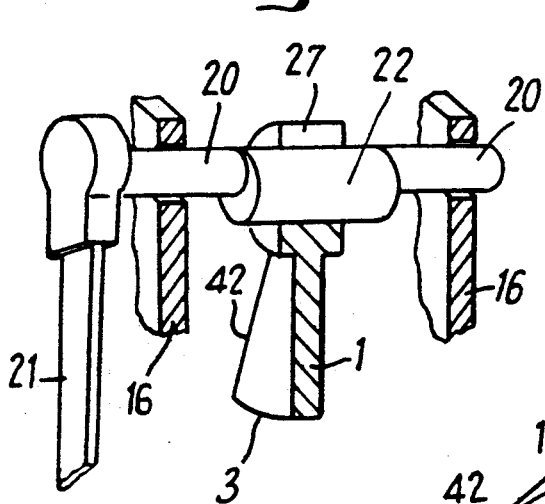
FIG. 15 is a schematic view, with parts cut away, illustrating the rotational mounting of the cam of the system of FIGS. 13 and 14.
Figure 16:
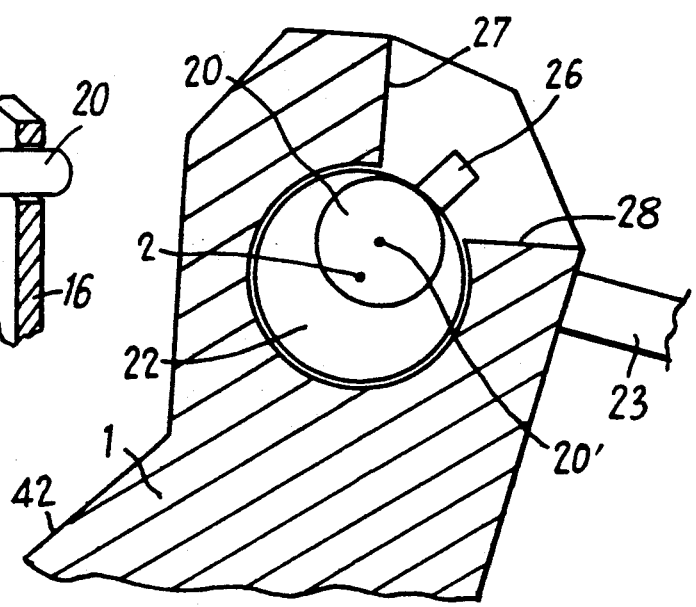
FIG. 16 is a cross section, on a larger scale, transversal to the axis of rotation of said cam, and showing precisely the mounting thereof on its shaft.
Figure 19:
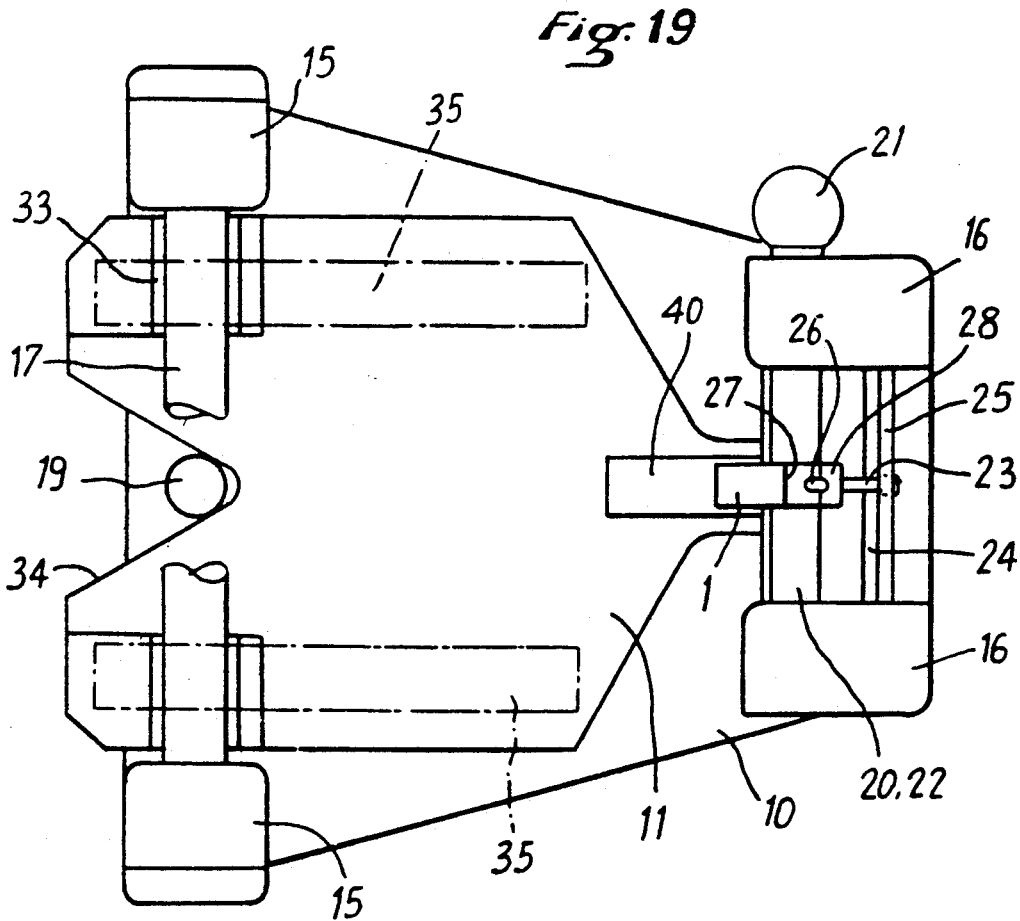
FIG. 19 is a partial top view showing the two elements in their spontaneous locked position.
Figure 20:
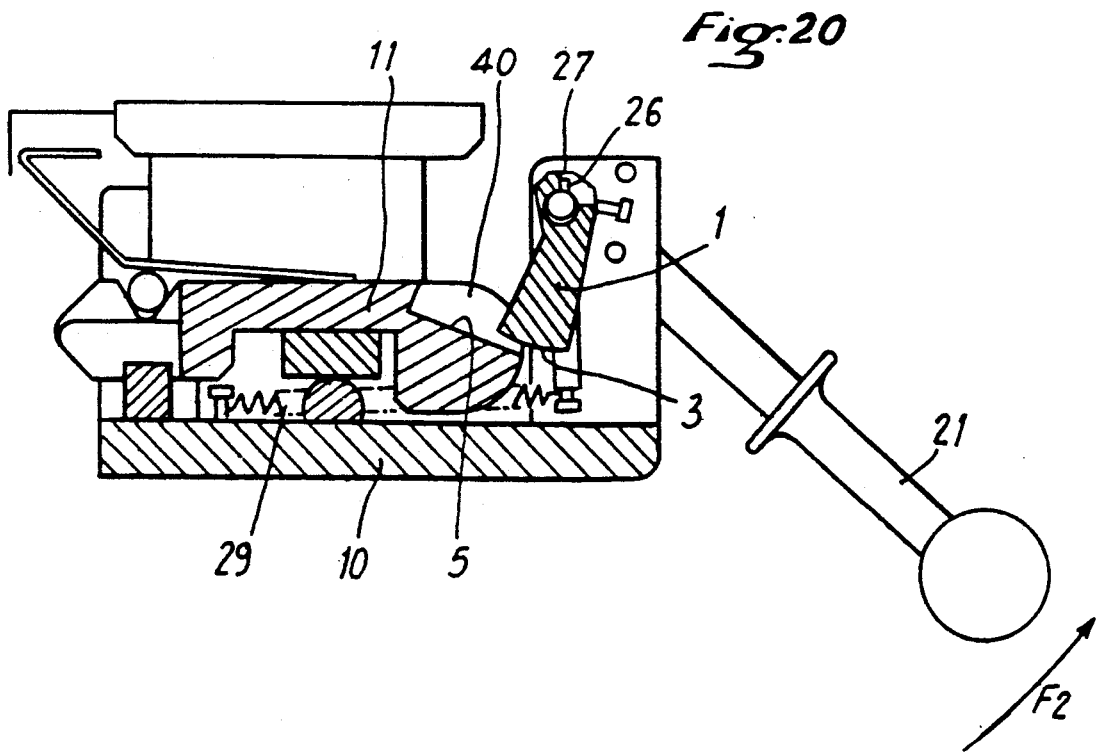
FIG. 20 and 21 illustrate, in schematic longitudinal section, unlocking of the elements of FIG. 13.
Figure 21:
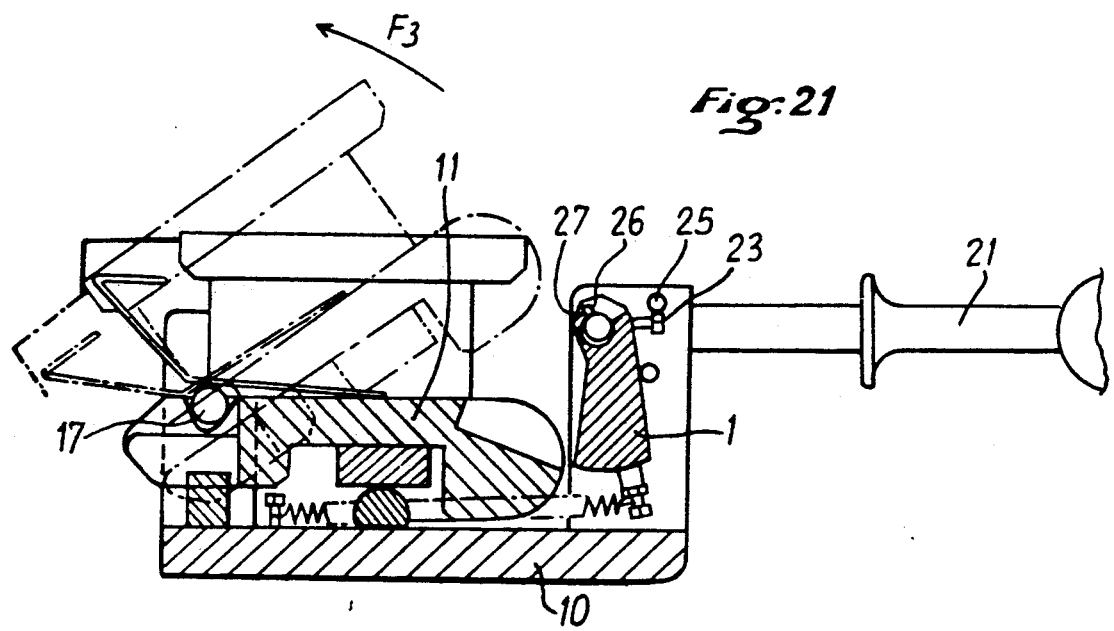

Cam 1 is mounted for rotation about a hub 22 with axis 2, itself mounted for rotation on a first element 10 (see FIGS. 13 to 29), via end journals 20, as is shown in FIG. 15. The axis 20' of the end journals 20 is off-centered with respect to axis 2, in the direction opposite the logarithmic contact face 3. Cam 1 is pressed in the direction of arrow f1 by resilient means 29, 55 (see FIGS. 13 to 29) in the direction of the flat bearing surface 5. The latter is fast with a second element 11, as will be explained hereafter.

A stud 26, fast with hub 22 and the end journals 20, may cooperate with a stop face 27 provided on said cam 1.

Moreover, as will be described hereafter, elements 10 and 11 are connected mechanically together, for example for rotation, so as not to be able to move away from each other when the contact face 3 bears for locking on the flat bearing surface 5.

In FIG. 2, elements 10 and 11 are in a relatively closed up position, such that the front end face 42 of cam 1 bears against the front face 39 (retraction means) of element 11. In this relative position, face 39 prevents the resilient means 29, 55 from causing cam 1 to rotate fully in direction f1, i.e. when said resilient means 29, 55 are taut. If elements 10 and 11 are moved away from each other, with the end face 42 of cam 1 still against face 39 of element 11, there comes a moment when cam 1 escapes from the retraction action of said face 39 (see FIG. 3). As soon as it escapes, the resilient means 29, 55 push cam 1 in direction f1 so that the logarithmic contact face 3 bears t 6 against the flat bearing surface (see FIG. 4). If, in this position, elements 10 and 11 are subjected to vibrations or to dimensional variations (for example under the effect of heat), cam 1 spontaneously takes another relative position, under the action of said resilient means 29, 55 which press it in the direction f1, such that now the contact point between face 3 and surface 5 (see FIG. 5) is located at 6'. Thus it can be seen that the system according to the invention is not only self-lockable, but further has the tendency to be always locked more. Not only in the position of FIG. 4 but also in that of FIG. 5, the locking pressure of cam 1 on face 5 causes a resilient deformation of the contacting portions of said elements 10 and 11. In these two positions, the contact range between faces 3 and 5 has been chosen so that reaction R passes through point 6 (or 6') and through the axis 2 of hub 22, as well moreover as through the axis 20' of journals 20.

If, from the locked position shown in FIG. 4 or FIG. 5, it is desired to unlock the two elements 10 and 11, the hub/22 journals 20 are rotated about axis 20' of the journals, in direction f2, opposite f1, against the action of the resilient means 29, 55 (see FIG. 6). An angular difference $\epsilon$ thus appears between the two axes passing through points 6 and 20' and points 6 and 2, respectively, thus, the pressure exerted by cam 1 on surface 5 decreases so that the resilient deformation of these elements, due to the compression, decreases. If rotation of hub 22 and journals 20 continues in direction f2 about axis 20', this pressure is further reduced until it is cancelled out (see FIG. 7). The angular difference between axes 6-20' and 6-2 has become $\delta$, which $\delta$ is larger than $\epsilon$. With further such rotation in direction f2, face 3 is detached from surface 5, because of the action of eccentricity between axes 2 and 20' (see FIG. 8 which disregards the action of the resilient means 29).

In this position, cam 1 is detached from element 11, but has not yet rotated in direction f2. Rotation of cam 1 in direction f2 can only begin from the moment when, with stud 26 brought into contact with stop 27 (see FIG. 9), the voluntary rotation of hub 22 and journals 20 is continued in direction f2 (see FIG. 10). Stud 26, bearing on stop 27, then pushes cam 1 back in direction f2, causing it to rotate about hub 22 (see FIG. 11). Continuation of such rotation then causes cam 1 to escape from the bearing surface 5 (see FIG. 12). The separation d of cam 1 (see FIG. 8) preceding the abutment of stud 26 on stop 27 forms a safety margin.

It will be readily understood that, with the invention, a self-lockable locking system is obtained making it possible to obtain a considerable locking force by using a small effort and which may moreover be unlocked by an unlocking action only requiring a small force. In addition, it is clear that this system allows automatic take-up of play.

In the embodiment shown in FIGS. 13 to 20, the self-lockable assembly system according to the invention makes it possible the assembly with reversible locking of its two separate elements 10 and 11. For example, element 10 is fixed to the structure 12 of a space vessel, on the outside thereof and element 11 is fast with a structure 13 (for example an antenna), which is to be fixed on said space vessel.

Element 10 comprises a thick indeformable plate 14 from which rise up pairs of lugs 15 and 16 disposed at opposite ends of said plate (see also FIG. 14). Between lugs 15 is mounted a fixed shaft 17. The upper part of lugs 15 is bevelled at 18, forming an opening (of angle Φ) diverging outwards for the space between said lugs 15. In line with the fixed shaft 17, in the median position thereof, a cylindrical stud 19 is provided, fixed to plate 10.

At the opposite end of plate 10, the rotary shaft 20 with axis 20' (see also FIGS. 15 and 16) is mounted in a bearing between lugs 16. The rotary shaft 20 is parallel to the fixed shaft 17 and may be actuated by a handle 21. As mentioned above, the median part 22 of rotary shaft 20 is off-centered with respect to said shaft, so as to form a hub for cam 1. On this median off-centered portion 22 of shaft 20 cam 1 is mounted so that the axis 2 of said cam merges with the axis of said off-centered portion 22. Thus, the rotary shaft 20 forms off-centered end journals for the median hub 22.

Rotation of cam 1 with respect to hub 22 is defined by a stop 23 fast with cam 1 and able to cooperate with pins 24 and 25 fixed to lugs 16.

Furthermore, stud 26 (not shown in FIG. 15) fixed to the rotary shaft 20 may cooperate respectively with stop faces 27, 28 carried by said cam, so that said cam may be rotated by acting on handle 21, in the way described above.

A system consisting of a spring 29 and a link 30 connected to cam 1 pulls cam 1 in the direction of the fixed shaft 17. In the uncoupled position of elements 10 and 11, in the position waiting to be coupled (position shown in FIG. 13), the spring system 29 applies stop 23 against pin 24, so that cam 1 occupies its endmost waiting position rotated in the direction of shaft 17, and handle 21 occupies a position such that stud 26 is between the stop faces 27 and 28, for example at equal distances therefrom.

A stop 31 is provided on plate 14, between the pairs of lugs 15 and 16.

Element 11 also comprises a thick indeformable plate 32, one end of which comprises bearing surfaces 33 in the form of a V defining a bearing line transverse to said plate, as well as a recess 34, also in the form of a V, in the thickness of said plate. The relative positions of bearing surfaces 33 and recess 34 are such that the fixed shaft 17 and stud 19 may be brought simultaneously and respectively between the V-shaped faces of said bearing surfaces 33 and of the recess 34. The V-shaped bearing surfaces 33 are closed by resilient blades 35, fastened to said plate at their end opposite said bearing surfaces, by means of screws 36. The resilient blades 35 are extended further by portions 37, bent away from plate 32. Opposite the bent back portions 37, the plate comprises bevels 38 of opposite directions, so that, between the resilient bent back portions 37 and bevels 38, aligned Vs are formed defining a line transverse to the plate 32.

At its opposite end, plate 32 comprises a rounded end face 39 with a longitudinal slit 40 whose width is greater than the thickness of cam 1 and whose bottom is flat so as to form the flat bearing surface 5, intended to cooperate with the logarithmic contact face 3 of said cam 1. A stop 41 is provided under plate 32.

Figure 13:
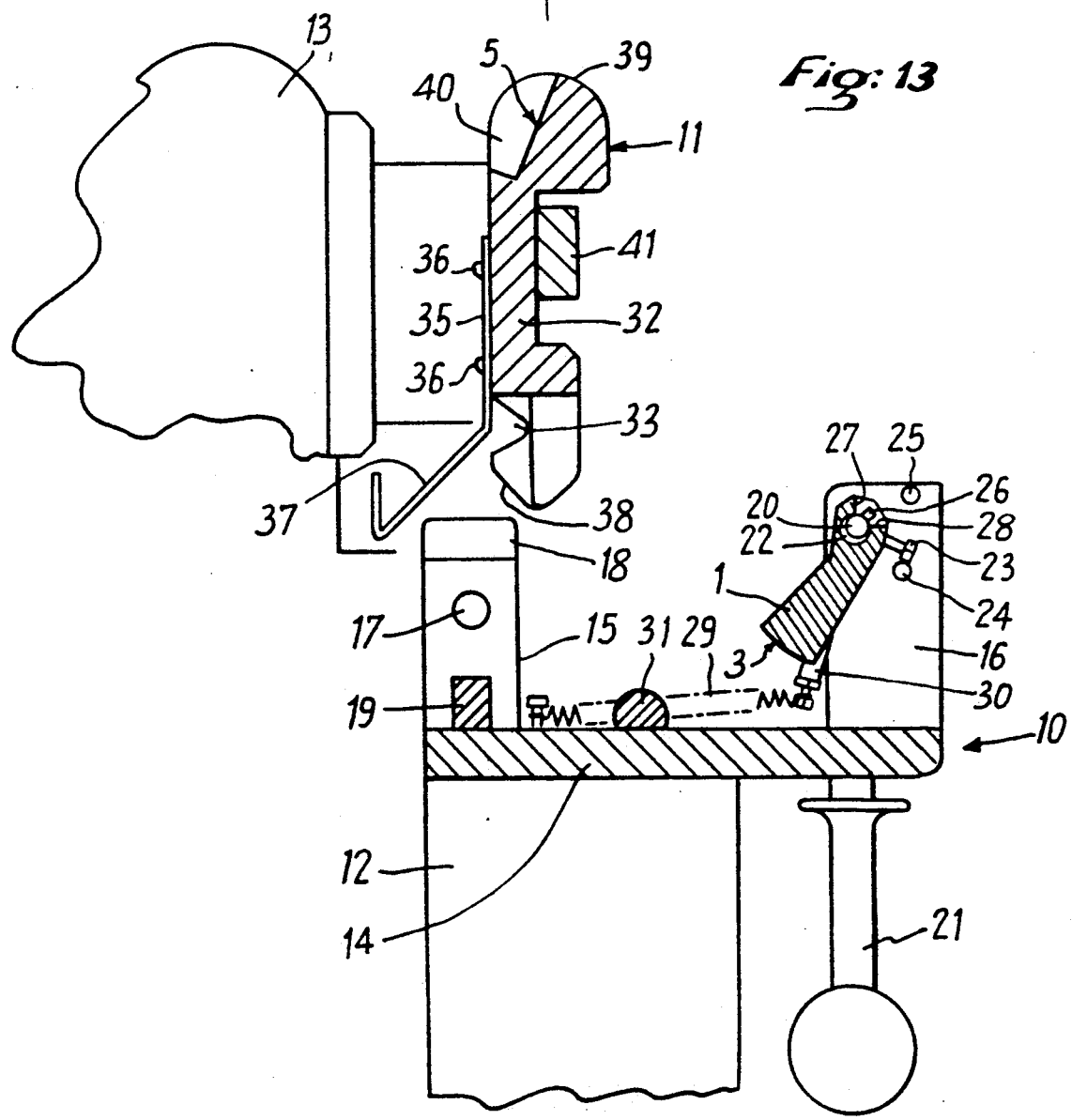
FIG. 13 illustrates, in schematic longitudinal section, a first embodiment of the invention, the two elements to be locked not being yet assembled.

When it is desired to assemble said elements 10 and 11 together, they are placed in a relative position shown in FIGS. 13 and 14 and brought together until the fixed shaft 17 is engaged in the Vs 37, 38. It will be noted that this drawing together movement is guided by said Vs, as well by the bevelled faces 18, which define the transverse position of element 11 with respect to element 10. When shaft 17 is in contact with the Vs 37, 38, a small pressure is exerted so that the resilient blades 35 move apart and said fixed shaft may penetrate into the V-shaped bearing surfaces 33. After penetration of said shaft 17 in said bearing surfaces, the resilient blades 35 press said shaft 17 against the V-shaped faces of said bearing surfaces. Then, said element 11 is caused to rock about the fixed shaft 17 (see arrow F in FIG. 17), until the rounded end portion 39 comes into contact with an end face 42 of cam 1.

If the rocking movement (arrow F) is continued, the rounded end portion 39 pushes said cam 1 back against the action of the spring system 29, said cam rotating about shaft 20, 22 (arrow f). Stop 23 separates from pin 24 and, with handle 21 remaining fixed, face 28 draws close to stud 26 (see the position shown in FIG. 16).

By further continuing the rocking movement of element 11 with respect to element 10, cam 1 is further pushed back by the rounded end portion 39 of element 11, until slit 40 is opposite said cam 1. At this moment, under the action of the spring system 29, cam 1 escapes from the pushing action of the rounded end portion 39 and penetrates into slit 40 (see arrow f1), its contact face 3 bearing on the flat surface 5 serving as bottom for said slit 40. Elements 10 and 11 are then in the relative position shown in FIGS. 18 and 19, in which:

the fixed shaft 17 is in contact with the V-shaped bearing surfaces 33;

stud 19 is in contact with the V-shaped faces of the recess 34;

stops 31 and 41 are in contact with each other.

After spontaneous snap-fitting of cam 1 in slit 40, elements 10 and 11 are automatically locked with respect to each other. It will be noted that the locked position thus reached only depends on the clearances between elements 10 and 11, which are taken up by the cam. In addition, this locked position is reliable for:

the forces transverse to the fixed shaft 17 are taken up by cooperation of bearing surfaces 33 and said fixed shaft 17;

the forces orthogonal to elements 10 and 11 are taken up by means of the fixed shaft 17, the bearing surfaces 33, cam 1, surface 5 and stops 31 and 41;

the forces parallel to the fixed shaft 17 are supported by stud 19 and recess 34;

the torques about an axis transversal to the fixed shaft 17 and about an axis orthogonal to elements 10 and 11 are taken up by shaft 17 and bearing surfaces 33;

the torque about an axis parallel to the fixed shaft 17 is taken up by stops 31, 41, cam 1 and surface 5.

If, from the optimum locked position thus obtained, it is desired to unlock elements 10 and 11, it is sufficient to rotate handle 21 in direction F2 (see FIG. 20) opposite to direction F. With such rotation, because of the excentric system 20, 22, cam 1 is first of all raised, its contact face 3 being moved away from the bearing surface 5, as was explained in connection with FIGS. 8 and 9, which provides unlocking. Then, with rotation of handle 21 continuing in direction F2, stop 26 arrives in contact with face 27, so that cam 1 is brought out of slit 40, against the action of the spring system 29. When stop 23 arrives in contact with pin 25 (see FIG. 21) element 11 is completely unlocked from element 10. It may then be disassembled by rotation in direction F3 (opposite to F) about the fixed shaft 17, then by disengagement of said fixed shaft 17 from the V-shaped bearing surfaces 33. Elements 10 and 11 are then in the relative position shown in FIG. 13. Handle 21 may, by rotation in direction F1, be brought back from the position shown in FIG. 20 to that shown in FIG. 13, so as to release cam 1, which takes up its waiting position again. Element 10 is then ready for another locked assembly operation, such as described above.

It can thus be seen that, with the invention, the locked position only depends on the play and not on the position of handle 21 and that unlocking takes place from any relative position of cam 1 with respect to the bearing surface 5.

Figure 22:
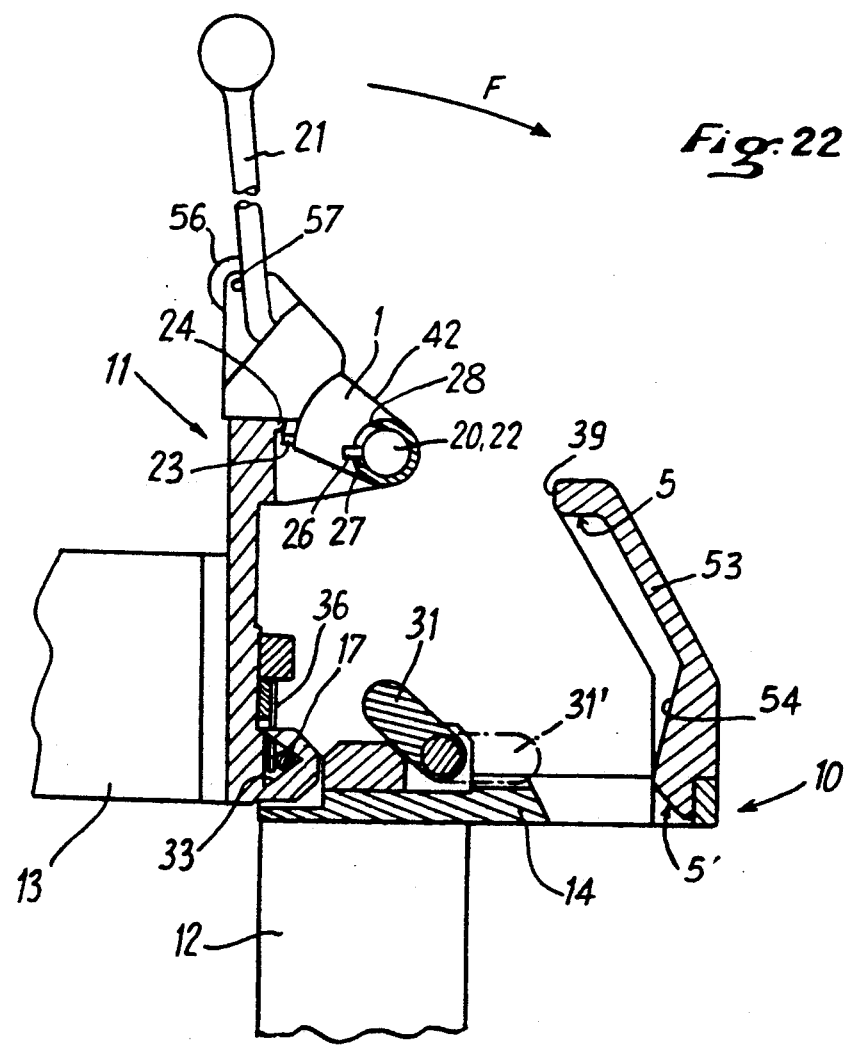
FIG. 22 illustrates, in schematic longitudinal section, a second embodiment of the invention, the two elements to be locked being fast with each other about a rotational shaft.

In the variant of the system according to the invention illustrated in FIGS. 22 to 29, we find again the same elements as in the embodiment shown in FIGS. 13 to 21, but with the following modifications:

the fixed articulation shaft 17, fast with element 10 is imprisoned in element 11, so that said elements 10 and 11 are no longer demountable;

the logarithmic cam 1, the control shaft 21, 22, stud 23, pin 24 and handle 21 are mounted on element 11 and not on element 10;

stop 31 fast with element 10 is fast with a rocking assembly 50 subjected to the action of a spring 51 (see FIG. 28), so as to be able to occupy a position 31 or a position 31' respectively shown with continuous lines and with broken lines in FIG. 22 and pre-established in the factory. In the position 31 of the stop, spring 51 is taut and the rocking assembly 50 is held in position by a pin 52. If pin 52 is withdrawn, spring 51 causes the stop to rock to position 31';

element 10 comprises a shoe 53 with two separate bearing surfaces 5 and 5';

the means for retracting ramp 1 comprise a rounded end 39 and an inclined plane 54, respectively carried by said shoe 53;

the centering and locking stud 19 fast with plate 14 is replaced by a bead 19 fast with the fixed shaft 17;

the spring 29 and link 30 system is replaced by helical springs 55, mounted on shaft 20, 22;

a safety system 56, with retractable pin 57, holds handle 21 in the set locked position.

Figure 23:
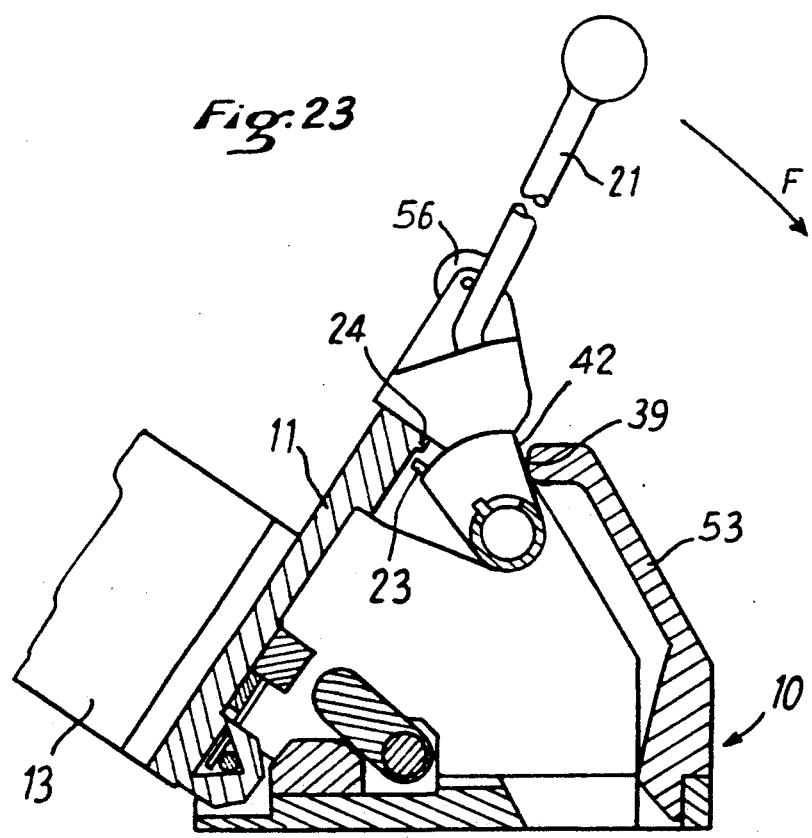
Figure 24:
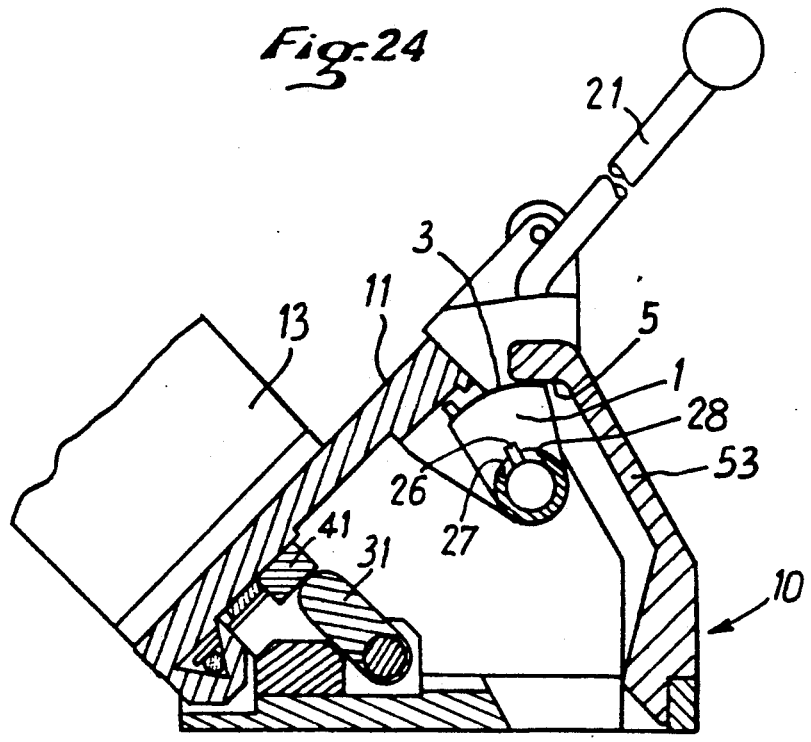
Figure 25:
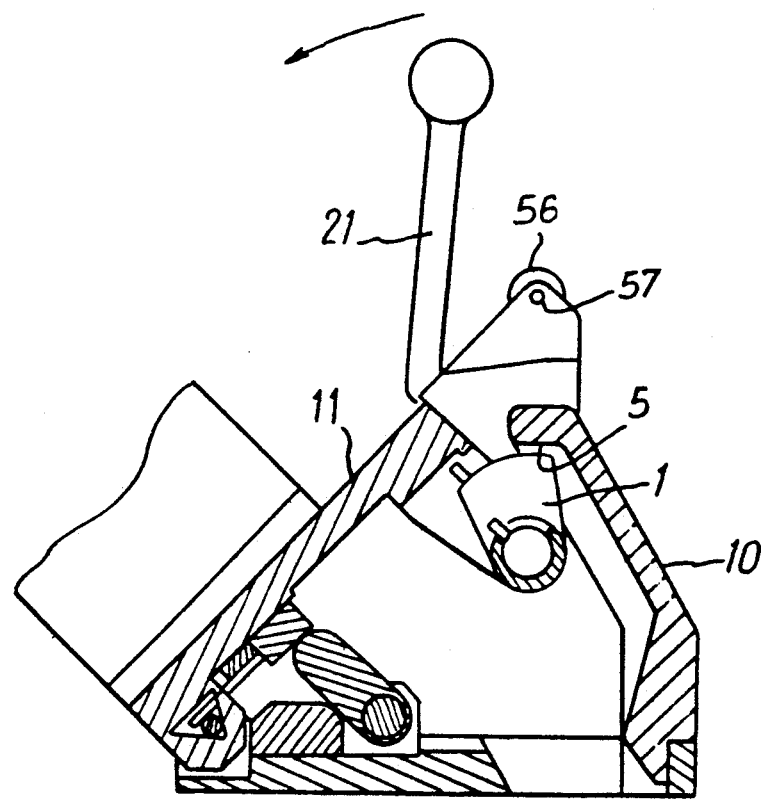
Figure 26:
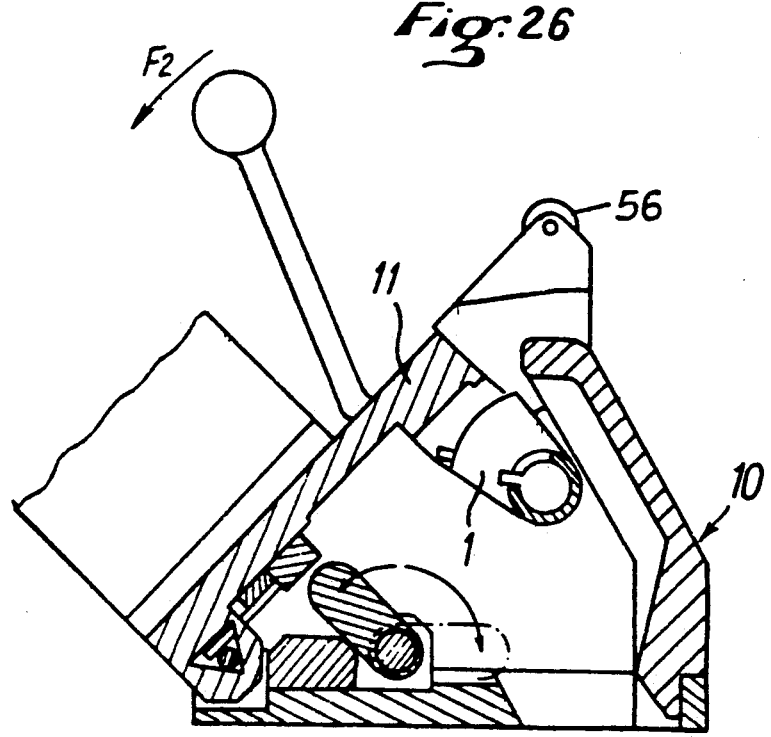

If stop 31 is in its most projecting position with respect to plate 14 (FIGS. 22 to 26), the operation is the following:

With the safety system 56 holding handle 21 in the set locked position, element 11 is rotated about fixed shaft 17 and in the direction of arrow F (FIGS. 22 and 23). As soon as the end face 42 of cam 1 reaches the rounded edge 39 of shoe 53 (FIG. 23), the cam is stopped so that if rotation in direction F continues, stop 23 is detached from its pin 24. With the rounded edge 39 passed, the logarithmic contact face 3 of cam 1 bears spontaneously under the bearing face 5 of shoe 53, under the action of springs 55, whereas stop 31 bears against stop 41.

To unlock the two elements 10 and 11 (see FIG. 25), the safety system 56 is actuated so that pin 57 is retracted and handle 21 may rotate in direction F2, opposite direction F. Because of the excentricity of the axis of rotation 2 of cam 1, the latter is disengaged from its bearing face 5. The disengagement is complete if rotation of handle 21 continues in direction F2 (see FIG. 26), so that it is then possible to bring element 11 back to its initial position shown in FIG. 22.

If, instead of bringing element 11 back to the position shown in FIG. 22, pin 52 is withdrawn, stop 31 takes the less projecting position 31' under the action of spring 51 and the end edge 42 may come into contact with the inclined plane 54 after resetting of handle 21 (FIGS. 27 and 28). By continuing this movement, the contact face 3 of the cam may be spontaneously anchored behind the second bearing face 5' (FIG. 29). It is then possible to unlock the two elements 10 and 11 (by rotation of handle 21 in direction F2 after removal of pin 57) in accordance with procedures similar to those described above.

It will be noted that at each manipulation the endmost positions of the control handle 21 are frozen and in complete abutment.

What is claimed is:

1. Locking system comprising:
    first and second mechanically-interconnected elements;
    a cam mounted for rotation on the first of said elements and having a contact surface adapted to press against a flat bearing face on the second of said elements;
    said contact surface of said cam having a profile substantially in the shape of a logarithmic spiral having an origin;
    said cam being rotatable about a hub having an axis on which is located the origin of said logarithmic spiral, said hub being mounted on said first element for rotation about an axis which is off-center with respect to the axis of said hub;
    resilient means biasing said cam for rotation in a first direction causing said contact surface to move towards said bearing face;
    a stud mounted on said hub for rotating said cam in a second direction opposite said first direction, said resilient means permitting rotation of said cam in said first direction; and
    means for rotating said hub about said off-centered axis of rotation in said second direction.

2. The system as claimed in claim 1, wherein the second of said elements comprises retraction means for momentarily pushing said cam back against the action of said resilient means, when said elements are brought close together and said contact surface of said cam bears on said bearing face of said second element by spontaneous snap-fitting under the action of said resilient means, after having escaped from said retraction means, for locking said elements.

3. The system as claimed in claim 1, wherein the closed up locked position of said elements is defined by a stop system.

4. The system as claimed in claim 1, wherein the endmost position which said cam may assume under the action of said resilient means is defined by a, stop.

5. The system as claimed in claim 1, wherein said first and second elements are together at their ends respectively opposite said cam and said bearing face, about an axis parallel to the axis of rotation of said cam.

6. The system as claimed in claim 5, wherein the articulation of said first and second elements forms a non demountable connection therebetween.

7. The system as claimed in claim 5, wherein the articulation of said first and second elements forms a demountable connection.

8. The system as claimed in claim 5, wherein the articulation of said first and second elements is formed by a fixed shaft fast with one element and by V-shaped bearing surfaces integral with the other element.

9. The system as claimed in claim 5, wherein one of said elements is integral with V-shaped bearing surfaces of a direction orthogonal to said axis of rotation between said elements, whereas the other element comprises a stop bearing against said V-shaped bearing surfaces when said elements are in the closed up position.

10. The system as claimed in claim 3, wherein said stop system is provided for defining several different closed up positions of the two elements, said second element comprises several retraction means and several separate bearing faces and, for each closed up position, said cam bears by its contact face against one of said bearing faces.

* * * * *